US005524864A

United States Patent [19]

Dubach

[11] Patent Number: 5,524,864

[45] Date of Patent: Jun. 11, 1996

[54] CHECK VALVE MADE OF PLASTIC

[76] Inventor: Werner F. Dubach, Im Hubrain 4, CH-8124 Maur, Switzerland

[21] Appl. No.: 382,019

[22] PCT Filed: Jun. 8, 1994

[86] PCT No.: PCT/CH94/00110

§ 371 Date: Feb. 10, 1995

§ 102(e) Date: Feb. 10, 1995

[87] PCT Pub. No.: WO94/29214

PCT Pub. Date: Dec. 22, 1994

[30] Foreign Application Priority Data

Jun. 11, 1993 [CH] Switzerland .......................... 1-761/93
Jun. 2, 1994 [CH] Switzerland .......................... 1-728/94

[51] Int. Cl.[6] .................................................... F16K 31/50

[52] U.S. Cl. ........................ 251/267; 251/274; 251/335.2

[58] Field of Search .................................... 251/215, 264, 251/265, 266, 267, 273, 274, 335.2

[56] References Cited

U.S. PATENT DOCUMENTS

| | | | |
|---|---|---|---|
| 3,151,838 | 10/1964 | Tripoli et al. | 251/267 |
| 3,327,992 | 6/1967 | Billeter et al. | 251/267 |
| 3,614,059 | 10/1971 | Rothauser | 251/267 |
| 3,747,894 | 7/1973 | Pepper | 251/215 |
| 4,280,680 | 7/1981 | Payne | 251/335.2 |
| 4,375,862 | 3/1983 | Kurinsky et al. | 220/293 |
| 4,452,425 | 6/1984 | Lucking | 251/342 |
| 4,471,807 | 9/1984 | Lucking et al. | 137/614.19 |
| 4,744,391 | 5/1988 | Lardner | 251/273 |
| 4,799,646 | 1/1989 | Rollett | 251/264 |
| 4,917,355 | 4/1990 | Dark et al. | 251/264 |
| 5,106,055 | 4/1992 | Phillips | 251/264 |

FOREIGN PATENT DOCUMENTS

| | | | |
|---|---|---|---|
| 403943 | 10/1967 | Australia . | |
| 503632 | 7/1983 | Australia . | |
| 0115164 | 8/1984 | European Pat. Off. . | |
| 0150144 | 7/1985 | European Pat. Off. . | |
| 0432070 | 6/1991 | European Pat. Off. . | |
| 1319374 | 1/1963 | France | 251/267 |
| 212655 | 12/1960 | Germany | 251/267 |
| 2152019 | 7/1985 | United Kingdom . | |

*Primary Examiner*—George L. Walton
*Attorney, Agent, or Firm*—Speckman, Pauley & Fejer

[57] ABSTRACT

A check valve made of plastic for containers of liquids. The check valve includes a valve housing having an inlet connector and an outlet opening. The outlet opening includes a valve seat. A linearly displaceable valve sealing body can be moved toward and away from the valve seat.

5 Claims, 4 Drawing Sheets

CHECK VALVE MADE OF PLASTIC

BACKGROUND OF THE INVENTION

1. Field of the Invention

This invention relates to a check valve made of plastic used for dispensing a fluid from a container.

2. Description of Prior Art

Such valves are often used with foil containers for liquids, and in turn are placed into cardboard boxes. This type of packaging is known by the phrase "bag-in-box". The advantages of such packaging are low weight, easy stacking, avoidance of transporting the empty container and low price compared with glass containers or metal drums.

It follows that the check valve for pouring liquid provided with such packaging must also be of low cost. For this reason valves made of plastic are generally used, which can be easily connected with, and in particular affixed to, the foil of the container. Besides different, multi-part, complex and expensive solutions, some simple solutions are also known.

U.S. Pat. No. 4,375,862, for example, discloses a rather complicated check valve which is designed as a plug-in valve. A flange welded to the plastic bag is seated in the cardboard packaging. A plug housing with a central plug, whose end toward the container is closed by a sealing peg which can be pushed out, is sealingly seated in the flange. A multi-part plug can be pushed into the plug housing, where it locks together with the sealing peg and pushes it into the container. The actual opening or closing position is achieved by turning the plug in the plug housing. Such a valve only permits small flow-through openings and the fluid path between the sealing point and the outlet opening at the end is very long. Accordingly, such a valve is only suited for very mobile containers, and dripping of the liquid long after the valve has been closed is unavoidable.

A valve which is particularly simple and includes only a few components is disclosed by Australian Reference 403, 943. Here, the valve body is essentially a cylindrical connector with a flange on the inlet side with which the plastic container is connected, and with a diaphragm sealing the end on whose inside a push rod is disposed. A valve plate, which in the closed state rests on the valve seat in the valve body, is seated on the push rod. With pressure applied to the flexible diaphragm, the rod pushes the valve plate inside the valve body away from the valve seat. The liquid flows around the valve plate and by a radial outflow bore reaches the outside in the area between the valve seat and the sealing, flexible diaphragm. The valve plate remains always inside the valve body and constitutes a constant obstacle to the flow during opening. Dripping occurs for a relatively long time after the valve is closed, until the void behind the valve plate has been completely emptied. A further embodiment is disclosed in the same reference, wherein the plate has been replaced by a linearly displaceable plug with a flow-through opening. In the closed position the lateral wall of the linearly displaceable sealing plug lies across the radial outflow opening in the valve body. The flow paths in this valve are also disadvantageous and sealing is questionable, in particular the second embodiment discussed.

Two similar check valves of the same applicant are known from the two U.S. Pat. Nos. 4,471,807 and 4,452,425, both of which have a similar design. These check valves made of plastic include a valve housing with an inlet connector and an outlet opening which serves as a valve seat, and a linearly displaceable movable valve sealing body which can be moved away from the valve seat by a push rod. The pressure of the liquid on the side of the push rod acts on the valve plate. The great advantage of such valves is that the valve sealing body directly closes off the outlet opening, since the outlet opening serves as the valve seat. Accordingly, there is almost no post-dripping of the liquid. However, it is disadvantageous that the liquid rests against the push rod side of the valve plate and that the valve plate is displaced in the direction of the applied pressure during opening. A potential interior pressure could open the valve accidentally. Furthermore, the push rod is moved in the opening direction by a flexible diaphragm. Unintended pressure on this exposed diaphragm therefore causes an unwanted opening of the valve.

U.S. Pat. No. 4,471,807 discloses a solution to the first mentioned problem. A valve plate on the inlet side of the opening is displaced away from the opening and into the interior of the container by a reversing mechanism acting on the push rod. This complicates the closure and reduces the flow-through of the fluid.

U.S. Pat. No. 4,452,425 discloses a simple solution to the second problem by positioning a protective cap over the flexible diaphragm. The cap must be removed prior to each use. However, both solutions still have certain structural disadvantages. One disadvantage is that the interior pressure in the container is not used for closing the valve. Another disadvantage is that the push rods lie in the outlet opening when the valve is opened and therefore reduce the free cross-sectional outflow area. Yet another disadvantage is that the actual valve sealing body lies directly in the stream of the evacuating fluid, which can spray uncontrollably in all directions.

SUMMARY OF THE INVENTION

It is therefore one object of this invention to provide a check valve made of plastic of the type mentioned at the outset, by which it is possible to eliminate the mentioned disadvantages.

This object is achieved with a check valve having an inlet connector, an outlet opening which serves as a valve seat and a linearly displaceable valve sealing body which can be moved away from the valve seat by a push rod. Liquid pressure acts on the valve sealing body on the side of the push rod. With the valve plate moved away from the valve seat into the interior of the valve housing, the valve sealing body opens the flow path, the push rod no longer lies in the outflow opening and after the valve is closed, the applied interior pressure increases the closing force. The check valve can be designed so that the valve plate can be moved into the valve housing far enough so that the entire flow-through space between the outlet connector and the outlet opening is free, and very large amounts of fluid can flow in a short time. In this regard it is relatively unimportant how the valve sealing body is moved away from the valve seat into the interior of the valve body.

BRIEF DESCRIPTION OF THE DRAWINGS

The above-mentioned and other features of this invention can be explained in conjunction with the drawings wherein.

DESCRIPTION OF PREFERRED EMBODIMENTS

Figure 1:
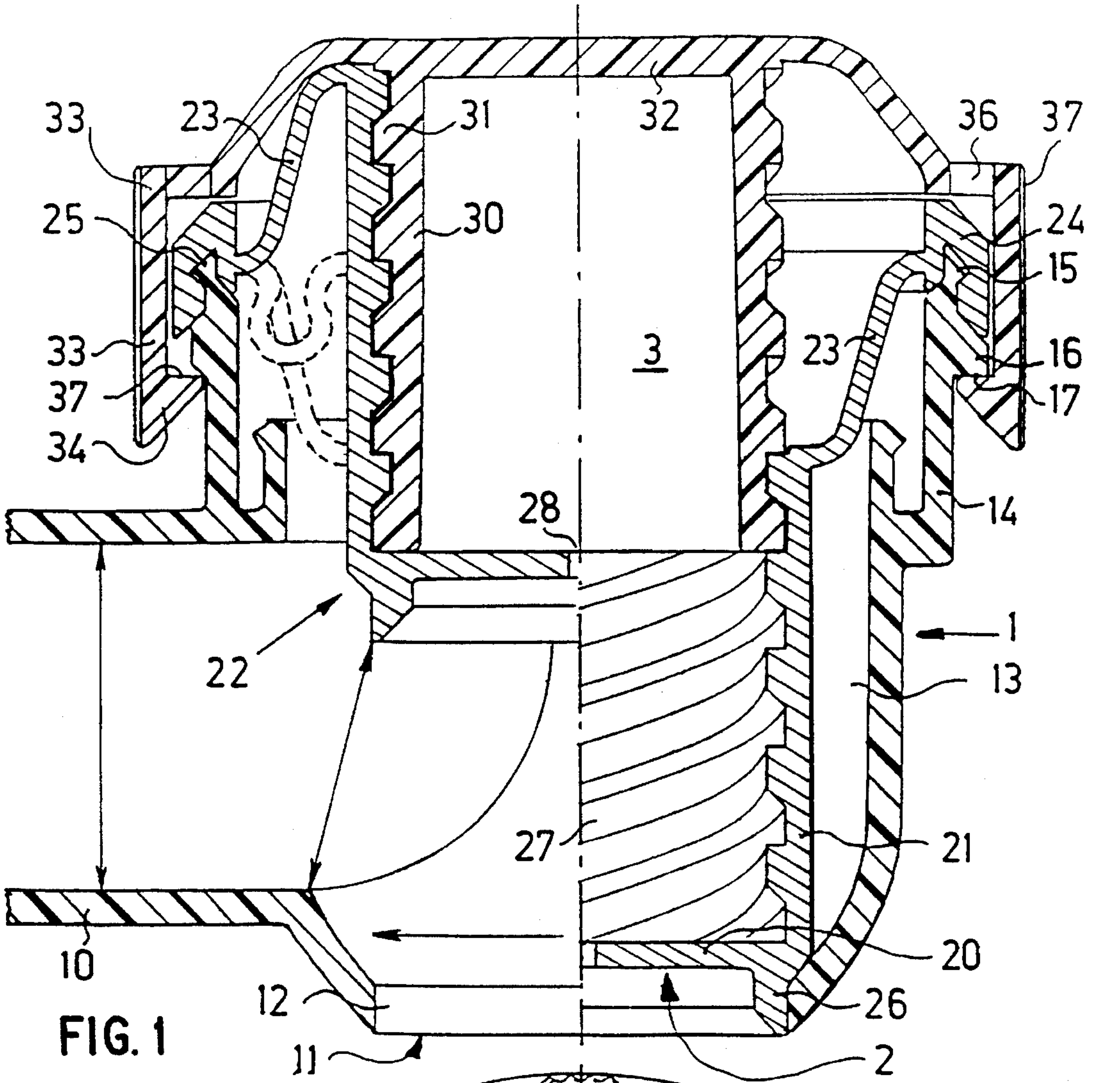
FIG. 1 shows a partial sectional view of an assembled valve according to one preferred embodiment of this invention, wherein the left half of the figure represents a completely opened valve and the right half of the figure represents a completely closed valve.

The check valve in accordance with one preferred embodiment of this invention comprises two elements, including a valve housing 1 and a valve sealing body 2 movable therein. In a relatively less complex embodiment the valve housing 1 is closed at the top and the valve sealing body includes a valve plate and a piston wall which is sealingly movable within of the valve housing 1. The valve plate can be lifted off an outlet opening, which serves as a valve seat within the valve housing 1.

The structure of the valve housing 1 is similar in each of the preferred embodiments shown. The valve housing 1 includes an inlet connector 10 constituting an inlet opening. Means for fastening the valve housing 1 on a liquid container are provided on the inlet connector 10. Such means are not the subject of the invention and are therefore not illustrated. Such fastening means can include a thin-walled flange which can be directly welded to the liquid container. The inlet connector 10, which is preferably cylindrical, terminates in a preferably cylindrical flow-through chamber 13 of the valve housing 1. The flow-through chamber 13 has a circular outlet opening 11 on the bottom. The outlet opening serves as a valve seat 12. The flow-through chamber 13 is also completely open toward the top and has a radially projecting annular wall 14 extending further upward. The radially projecting annular wall 14 is provided with an annular holding bead 15 on an end portion. An outwardly oriented circumferential annular sliding bead 16 is disposed below the annular holding bead 15. The annular sliding bead 16 has breaks at only a few places for the purpose of assembly. The annular sliding bead 16 is closed off on the bottom by a radially outwardly oriented sliding ring face 17.

The valve sealing body 2 projects into the valve housing 1. In the embodiment shown in FIG. 1, the valve sealing body 2 has an overall shape of a sealing piston 22. The sealing piston 22 has a flexible sealing flange 23 disposed on an upper end portion. The flexible flange 23 is provided with a radially limiting holding ring 24. An annular groove 25 has been cut into the holding ring 24. The annular holding bead 15 interlockingly fits into the annular groove 25 of the holding ring 24 at the radially projecting annular wall 14 of the valve housing 1. The sealing piston 22 has a slightly greater diameter than the outlet opening 11 in the valve housing 1. The sealing piston 22 is closed off by a bottom which serves as the valve plate 20. In a closed state of the valve, only one sealing lip 26 extending in the axial direction and disposed on the valve plate 20 precisely engages the outlet opening 11. In this preferred embodiment the a wall 21 is formed as the cylindrical wall of the sealing piston 22. Thus, the a valve plate 20 and the wall 21 compose the valve sealing body 2 formed as the sealing piston 22. If the valve sealing body 2 is moved up and down, the flexible sealing flange 23 follows this movement. The valve sealing body 2 is preferably made entirely from an elastomer to achieve such movements and to absorb certain dimensional inaccuracies in the area of the outlet opening 11.

Figure 2:
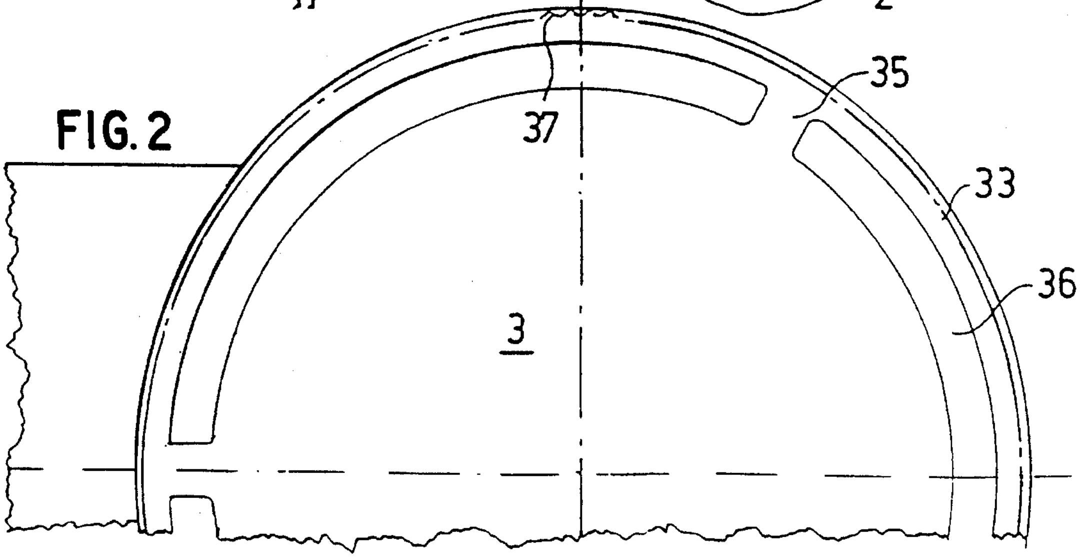
FIG. 2 shows a top partial view of the check valve of FIG. 1.

In one preferred embodiment according to this invention, direct pulling means, which could be manually operated, could be provided for actuating the valve sealing body 2. Actuating means 3 in the form of a twist grip are provided in the preferred embodiment shown in FIG. 1. The twist grip has a cover face 32 on whose underside a hollow plug 30, open at the bottom, is positioned. The plug 30 is provided with an exterior thread 31 which engages an interior thread in the sealing piston 22. The exterior periphery of the twist grip forms a vertical jacket wall 33 which is connected by ridges 35 to the cover face 32, as shown in FIG. 2. An inwardly projecting sliding bead 34, hook-shaped in cross section, whose sliding surface 37, which is horizontal in the operating position, rests closely on the sliding surface 17 of the valve housing 1, is formed on the lower end of the vertical jacket wall 33. Through-openings 36, which are only interrupted by the ridges 35, are provided between the cover face 32, which extends obliquely downward in an edge portion, and the jacket wall 33. The through-openings 36 make it possible to produce the inwardly projecting portion of the hook-shaped sliding bead 34 by injection techniques so that no slides are required. Because the jacket wall 33 is less flexible in the portion of the ridges 35, the sliding bead 16 of the radially extending annular wall 14 of the valve housing 1 is accordingly reduced in the corresponding area.

For assembling the valve, the actuating means in the form of a twist grip can be completely or partially screwed together with the valve sealing body 2, whereupon the unit, comprising the valve sealing body 2 and the actuating means 3, can be pressed directly onto the valve housing 1. The actuating means 3 can only be pressed down to the extent that the hook-shaped sliding bead 34 can engage underneath the radially projecting annular wall 14 when the annular holding bead 15 of the annular wall 14 of the valve housing 1 has been pressed completely into the groove 25 of the holding ring 24 of the valve sealing body 2. If the actuating means 3 is turned, it performs a rotating movement without a translatory portion thereof. However, the valve sealing body 2 does not move in the radial direction, but only in the axial direction.

Since sealing of the valve between the valve seat 12 in the valve housing 1 and the cylindrical wall of the valve sealing body 2 in the form of a sealing piston 22 takes place at the exterior periphery, the valve plate 20 could, theoretically, be omitted. However, the liquid can penetrate into the hollow chamber of the sealing piston 22 in the open state of the closure and this liquid can subsequently drip when the closure is shut, if the valve plate 20 is omitted. Thus, it is preferable to close off the bottom of the sealing piston 22 with the valve plate 20. In addition, this also results in increased rigidity. The relatively small surface of the valve plate 20 is moistened by the liquid when the valve is used, and although this surface is small, the liquid adhering to the surface can subsequently drip. For the liquid to drip as soon as possible following the closing of the valve, it is preferable to provide a bore 28 in the valve plate 20.

Figure 3:
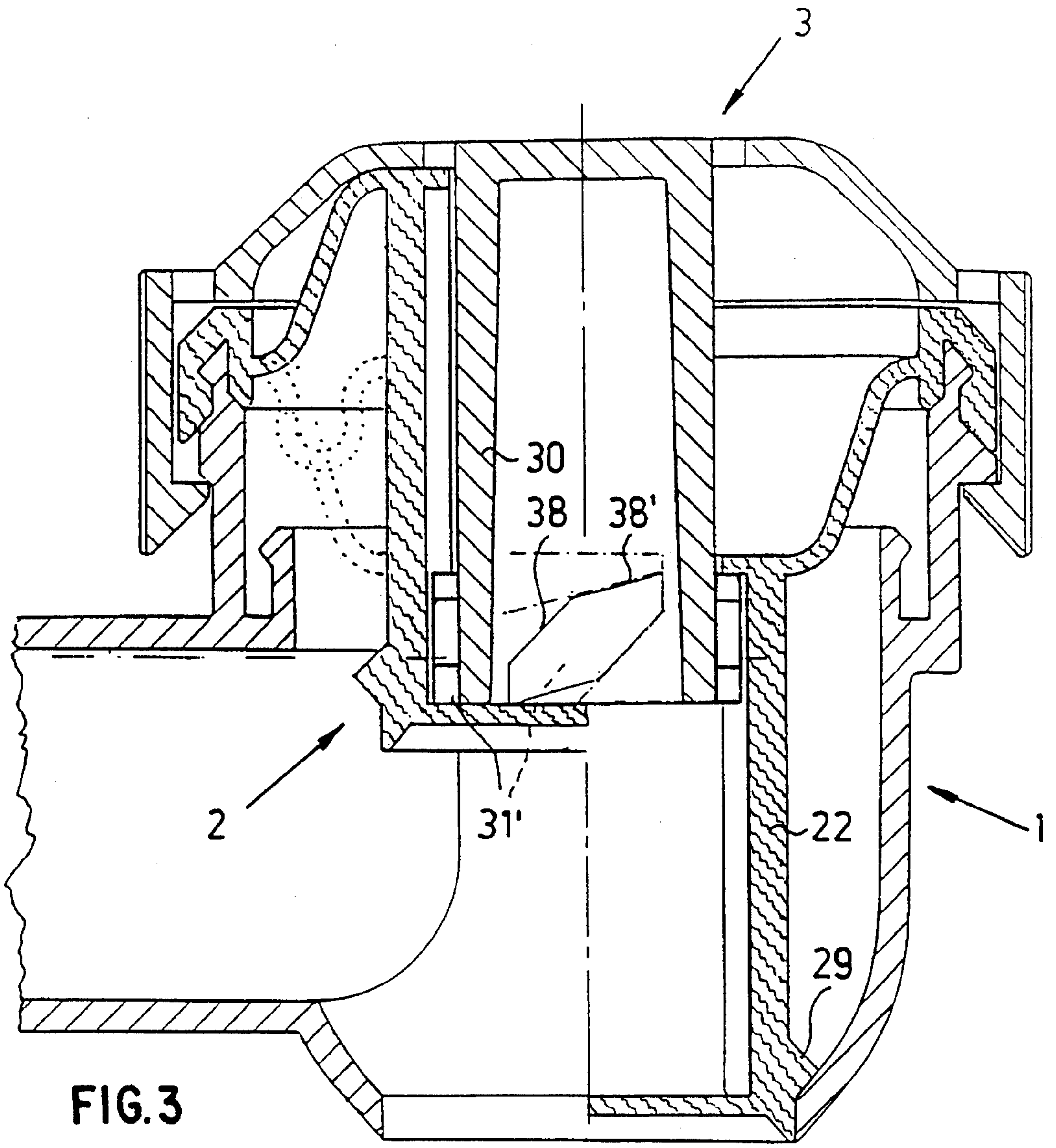
FIG. 3 shows a partial sectional view of an assembled valve according to another preferred embodiment of this invention, wherein the left half of the figure represents a closed valve and the right half of the figure represents an open valve.
Figure 4:
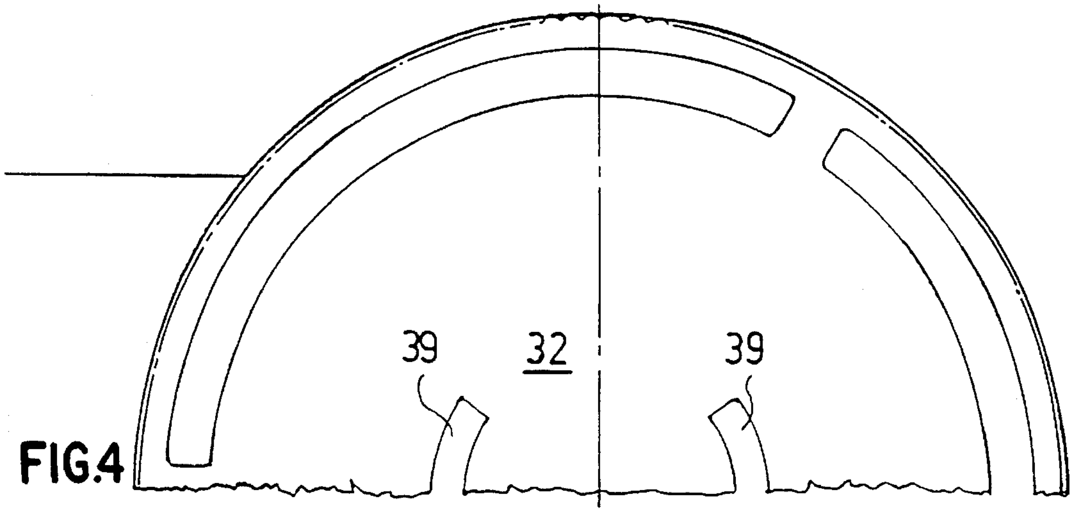
FIG. 4 shows a top partial view of the check valve of FIG. 3.
Figure 5:
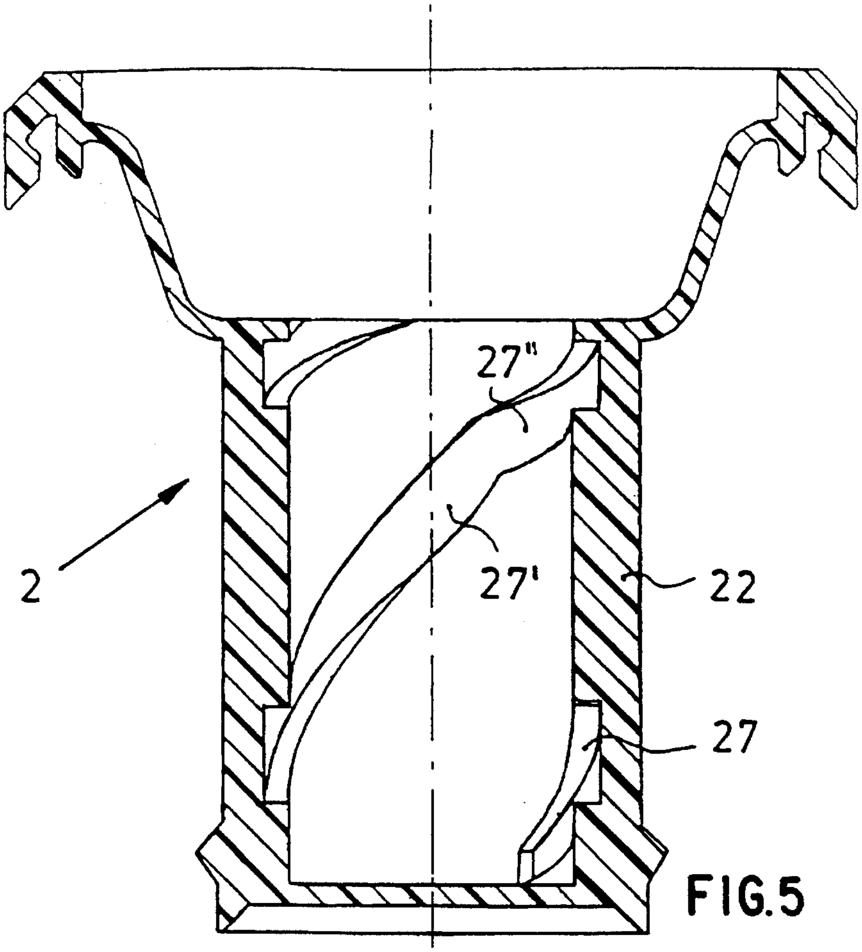
FIG. 5 shows a cross-sectional view of a sealing body in accordance with another preferred embodiment of this invention, wherein the sealing body has a special interior thread.
Figure 6:
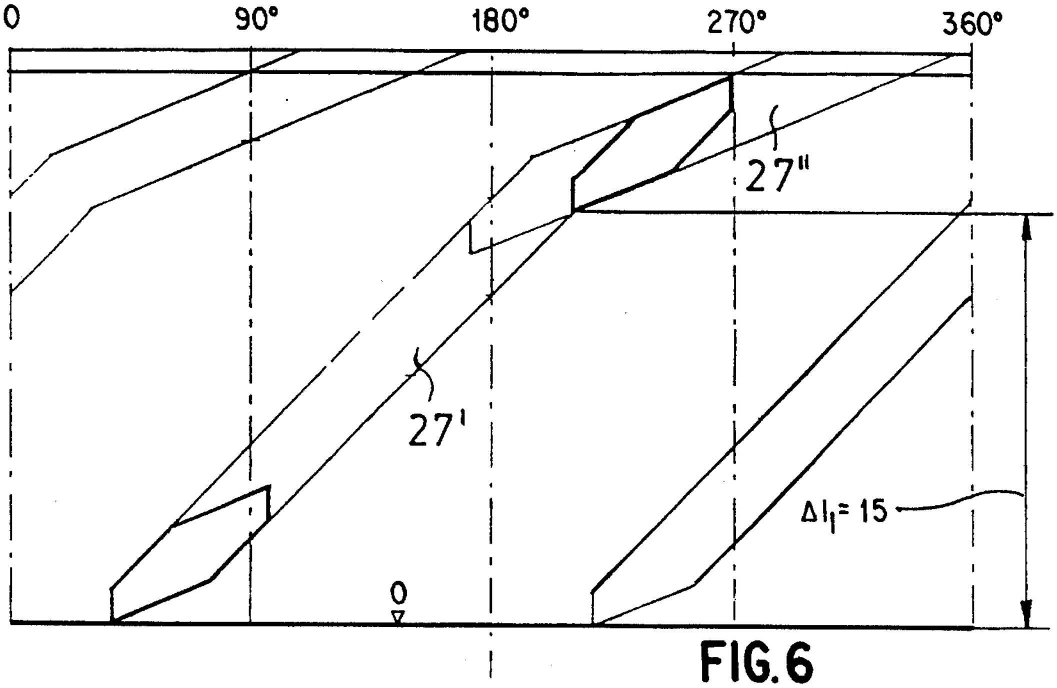
FIG. 6 shows an enlarged view of the interior thread shown in FIG. 5.

The valve housing 1 is essentially unchanged in the preferred embodiment of this invention shown in FIGS. 3 and 4. The valve sealing body 2 shows only a few changes with respect to the preferred embodiment of this invention shown in FIGS. 1 and 2. A radially projecting sealing bead 29 is positioned on the sealing piston 22. The interior thread 27 of the sealing piston 22 is specially designed. Such interior thread.27 can be seen in particular in FIGS. 5 and 6. FIG. 5 shows a sectional view of the valve body 2, and FIG. 6 shows an enlarged view of the interior thread 27. The interior thread 27 has two portions which respectively are a first thread section 27' with a greater pitch angle and a second thread section 27" with a lesser pitch angle. Thus, in the lowermost closing or opening position the valve sealing body 2 is axially displaced relative slowly with respect to the rotating movement of the actuating means 3, while after a certain rotation complete opening takes place more rapidly. This also permits the precise, metered delivery of small amounts of the liquid from the container. Accordingly, the plug 30 is no longer provided with a complete exterior thread. The exterior thread of the plug 30 is correspondingly reduced to two catch elements 31, 31' which have two radially opposed thread sections having differently inclined edge face sections 38 and 38', as shown in FIG. 3. When the steeper edge faces 38 rest in the steeper areas of the thread pitches 27', the flatter edge faces 38' rest in the less steep thread areas 27". So that the catch elements 31, 31' can also be injection molded without slides, two injection-mold slits 39 can be cut into the cover face 32.

The exterior of the jacket wall 33 of the twist grip can be provided with a knurling 37 as shown in FIG. 2.

Figure 8:
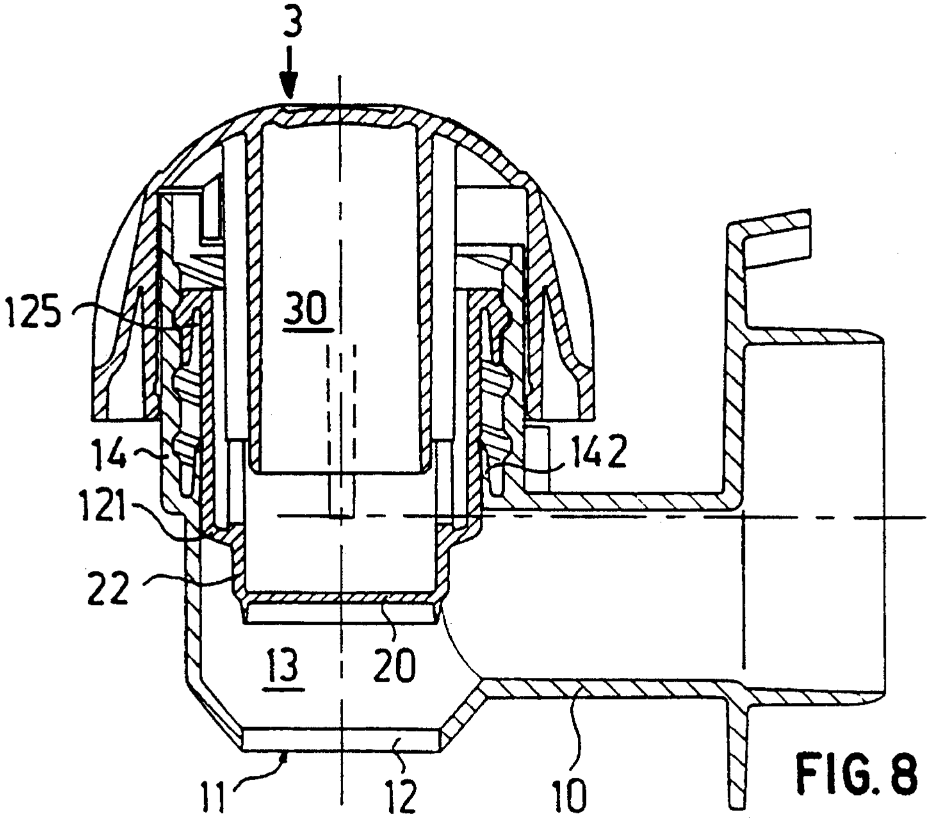
FIG. 8 shows a cross-sectional view of the valve of FIG. 7 in an opened position.

Another preferred embodiment according to this invention is shown in FIGS. 8 and 9. The valve sealing body 2 can again be moved into the valve housing 1.

In such embodiment a means 18 for fastening the valve on the container is shown. It comprises a sealing flange 19 which sealingly fits directly into an opening of the container or into a closure fastened thereon.

The construction of the valve body is generally the same as the previously described valve body, so that the reference numerals used previously, for example 10 for the inlet connector, 11 for the outlet opening, 12 for the valve seat, 13 for the flow-through chamber and 14 for the radially offset annular wall, have been retained.

Figure 7:
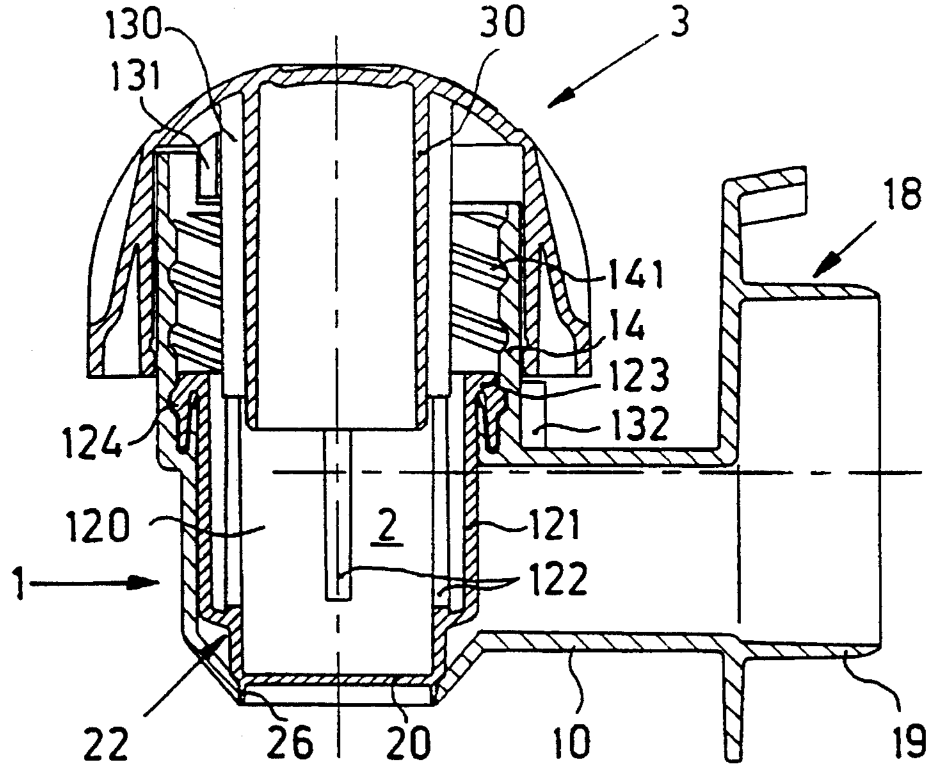
FIG. 7, shows a cross-sectional view of a closed valve according to another preferred embodiment of this invention.

The valve sealing body 2 is formed as a sealing piston 22 and is closed off at the bottom by a valve plate 20 with a sealing lip 26. However, the sealing piston 22 according to one preferred embodiment of this invention, as shown in FIGS. 7 and 8, is double-walled and does not have a flexible flange. An inner wall 120 extends cylindrically from the upper edge to the sealing plate 20. Offset toward the top, as viewed from the direction of the sealing plate 20, there is a second wall 121 surrounding the inner wall 120 concentrically. The inner wall 120 of the hollow, cup-shaped sealing piston 22 extending along a certain length of inner wall 120 has axial guides 122, for example in the form of slots or grooves, from the upper edge to the place of connection with the inner wall 120. The second wall 121 has a thickened portion 123, which is provided with an exterior thread 124. An annular cut 125 in extension of the exterior surface of the second wall 121 causes the thread to fit radially resiliently and thus also sealingly into an interior thread 141 of the annular wall 14 of the valve housing 1.

The actuation means 3 is in the form of a twist grip having a plug 30 interlocked with the cylindrical hollow chamber of the sealing piston 22. Outwardly projecting catches 130 are disposed on the exterior wall of the plug 30, for example in the form of radial ribs. The catches 130 fit into the guides 122 and transmit the rotating movement of the grip 3 to the valve sealing body 2 so that a combined rotating and translatory movement can be achieved.

Stops 131 and 132 are provided so that the valve sealing body 2 cannot be screwed completely out of the valve housing 1 or cannot be over rotated during closing of the valve.

The sealing of the valve can be further improved by an annular sealing lip 142 in the valve housing 1, which rests sealingly against the sealing piston 22.

I claim:

1. In a check valve made of plastic for containers of liquids, the check valve having a valve housing (1) with an inlet connector (10), the valve housing (1) having an outlet opening (11), the outlet opening (11) having a valve seat (12), a valve sealing body (2) defining a sealing piston (22) linearly displaceable from the valve seat (12), a pressure of a fluid acting on the valve sealing piston (22) on a side thereof, a valve plate (20) displaceable from the valve seat (12) into an interior of the valve housing (1), the sealing piston (22) engageable with an interior thread (141) disposed within the valve housing (1), a lower portion of the sealing piston (22) serving as a valve plate (20), the valve plate (20) movable toward and away from the valve seat (12) by an actuating means (3), the actuating means (3) having a twist grip portion thereon, the improvement comprising: the sealing piston (22) having an interior well (120) and an exterior wall (121), the interior wall (120) being concentric thereto, the interior wall (120) having at least one axial guide (122) extending a certain distance along the interior wall (120), the actuating means (3) having at least one axial catch (130) of a certain length, the at least one axial guide (122) engaging said at least one axial catch (130), the exterior wall (121) having a thickened portion (123) disposed proximate an upper end portion of the exterior wall (121), the thickened portion (123) having an exterior thread (124) thereon threadedly engageable with the interior thread (141).

2. In a check valve in accordance with claim 1, wherein the valve sealing body (2) is positioned in the valve housing (1) so that a flow-through chamber (13) between the inlet connector (10) and the outlet opening (11) is free of obstructions.

3. In a check valve in accordance with claim 1, wherein the thickened portion (123) has an annular groove (125) to provide resiliency to the exterior thread (124).

4. In a check valve in accordance with claim 1, wherein an annular sealing lip (142) is disposed on the valve housing (1), and the annular sealing lip (142) rests against the sealing piston (22).

5. In a check valve in accordance with claim 1, wherein a circumferential sealing lip (26) is disposed on a peripheral portion of the valve plate (20).

* * * * *